(12) United States Patent
Wells et al.

(10) Patent No.: US 10,162,447 B2
(45) Date of Patent: Dec. 25, 2018

(54) DETECTING MULTIPLE SIMULTANEOUS FORCE INPUTS TO AN INPUT DEVICE

(71) Applicant: Apple Inc., Cupertino, CA (US)

(72) Inventors: Nicole M. Wells, San Francisco, CA (US); Wayne C. Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/791,618

(22) Filed: Oct. 24, 2017

(65) Prior Publication Data
US 2018/0046307 A1 Feb. 15, 2018

Related U.S. Application Data

(63) Continuation of application No. 14/637,563, filed on Mar. 4, 2015, now Pat. No. 9,798,409.

(51) Int. Cl.
G06F 3/041 (2006.01)
G06F 3/0354 (2013.01)

(52) U.S. Cl.
CPC ........ *G06F 3/0414* (2013.01); *G06F 3/03547* (2013.01); *G06F 2203/04105* (2013.01)

(58) Field of Classification Search
USPC .................... 345/173–178; 178/18.01–20.01
See application file for complete search history.

(56) References Cited

U.S. PATENT DOCUMENTS

| 3,176,241 A | 3/1965 | Hogan |
| 4,423,640 A | 1/1984 | Jetter |
| 4,558,757 A | 12/1985 | Mori |
| 4,577,174 A | 3/1986 | Lemmer |
| 4,716,393 A | 12/1987 | Logie |
| 4,897,582 A | 1/1990 | Otten et al. |
| 5,052,844 A | 10/1991 | Kendall |
| 5,103,404 A | 4/1992 | McIntosh |
| 5,231,336 A | 7/1993 | van Namen |

(Continued)

FOREIGN PATENT DOCUMENTS

| CN | 1659583 | 8/2005 |
| CN | 101477422 A | 7/2009 |

(Continued)

OTHER PUBLICATIONS

"Immersion Announces MOTIV™ Development Platform for Android," retrieved from the Internet: URL:http://ir.immersion.com/releasedetail.cfm?sh_email=no&releaseid=549080, Feb. 10, 2011.

(Continued)

*Primary Examiner* — Chad M Dicke
(74) *Attorney, Agent, or Firm* — Brownstein Hyatt Farber Schreck, LLP

(57) ABSTRACT

A force-sensitive input device for receiving user input. The input device can include a contact (e.g., touch) sensor and a plurality of force sensors. By combining the information from a multi-touch event with information from each of the plurality of force sensors, a contact centroid and a force centroid can be determined. Thereafter, by projecting a vector defining the force applied to the input device onto a vector defined between the contact centroid and an individual contact location, a magnitude of force applied at that contact location can be approximated.

19 Claims, 10 Drawing Sheets

(56) References Cited

U.S. PATENT DOCUMENTS

| | | |
|---|---|---|
| 5,541,372 A | 7/1996 | Baller et al. |
| 5,734,373 A | 3/1998 | Rosenberg |
| 5,805,138 A | 9/1998 | Brawne |
| 5,999,168 A | 12/1999 | Rosenberg et al. |
| 6,100,874 A | 8/2000 | Schena et al. |
| 6,219,038 B1 | 4/2001 | Cho |
| 6,337,678 B1 | 1/2002 | Fish |
| 6,373,465 B2 | 4/2002 | Jolly |
| 6,388,655 B1 | 5/2002 | Leung |
| 6,492,979 B1 | 12/2002 | Kent |
| 6,518,954 B1 | 2/2003 | Chen |
| 6,747,631 B1 | 6/2004 | Sakamaki |
| 6,816,049 B2 | 11/2004 | Watanabe |
| 6,937,124 B1 | 8/2005 | Nakamura |
| 6,940,494 B2 | 9/2005 | Hoshino et al. |
| 7,031,592 B2 | 4/2006 | Akieda |
| 7,044,681 B2 | 5/2006 | Quenzi et al. |
| 7,091,886 B2 | 8/2006 | DePue |
| 7,152,482 B2 | 12/2006 | Ueno |
| 7,176,897 B2 | 2/2007 | Roberts |
| 7,219,549 B2 | 5/2007 | Honkura et al. |
| 7,245,293 B2 | 7/2007 | Hoshino et al. |
| 7,283,120 B2 | 10/2007 | Grant |
| 7,331,245 B2 | 2/2008 | Nishimura |
| 7,436,396 B2 | 10/2008 | Akieda |
| 7,443,384 B2 | 10/2008 | Harada |
| 7,511,706 B2 | 3/2009 | Schena |
| 7,525,532 B2 | 4/2009 | Liu et al. |
| 7,532,202 B2 | 5/2009 | Roberts |
| 7,557,051 B2 | 7/2009 | Ryu |
| 7,567,232 B2 | 7/2009 | Rosenberg |
| 7,639,232 B2 | 12/2009 | Grant et al. |
| 7,656,388 B2 | 2/2010 | Schena et al. |
| 7,656,393 B2 | 2/2010 | King |
| 7,685,538 B2 | 3/2010 | Fleck et al. |
| 7,692,078 B2 | 4/2010 | Hayashi |
| 7,710,397 B2 | 5/2010 | Krah et al. |
| 7,791,506 B2 | 9/2010 | Riihimaki |
| 7,791,588 B2 | 9/2010 | Tierling et al. |
| 7,825,903 B2 | 11/2010 | Anastas et al. |
| 7,877,707 B2 | 1/2011 | Westerman |
| 7,920,225 B2 | 4/2011 | Nishikawa et al. |
| 7,920,694 B2 | 4/2011 | Cruz-Hernandez |
| 7,924,145 B2 | 4/2011 | Yuk |
| 7,948,337 B2 | 5/2011 | Chu |
| 7,952,566 B2 | 5/2011 | Poupyrev |
| 8,013,961 B2 | 9/2011 | Adachi et al. |
| 8,059,104 B2 | 11/2011 | Shahoian et al. |
| 8,059,105 B2 | 11/2011 | Rosenberg |
| 8,081,156 B2 | 12/2011 | Ruettiger |
| 8,084,968 B2 | 12/2011 | Murray et al. |
| 8,117,912 B2 | 2/2012 | Kawakubo |
| 8,132,468 B2 | 3/2012 | Radivojevic |
| 8,139,038 B2 | 3/2012 | Chueh |
| 8,144,129 B2 | 3/2012 | Hotelling |
| 8,169,332 B2 | 5/2012 | Son |
| 8,169,401 B2 | 5/2012 | Hardwick |
| 8,169,402 B2 | 5/2012 | Shahoian et al. |
| 8,232,969 B2 | 7/2012 | Grant |
| 8,252,695 B2 | 8/2012 | Tan |
| 8,259,066 B2 | 9/2012 | Cheng et al. |
| 8,260,337 B2 | 9/2012 | Periyalwar et al. |
| 8,264,465 B2 | 9/2012 | Grant et al. |
| 8,279,175 B2 | 10/2012 | Kim et al. |
| 8,287,522 B2 | 10/2012 | Moses et al. |
| 8,291,776 B1 | 10/2012 | Pickens |
| 8,296,670 B2 | 10/2012 | Matthews et al. |
| 8,310,350 B2 | 11/2012 | Pfau et al. |
| 8,310,444 B2 | 11/2012 | Peterson et al. |
| 8,310,452 B2 | 11/2012 | Takenaka et al. |
| 8,315,834 B2 | 11/2012 | Gimelfarb et al. |
| 8,319,727 B2 | 11/2012 | Norieda |
| 8,373,664 B2 | 2/2013 | Wright |
| 8,378,798 B2 | 2/2013 | Bells et al. |
| 8,378,965 B2 | 2/2013 | Gregorio et al. |
| 8,400,410 B2 | 3/2013 | Taylor |
| 8,421,567 B2 | 4/2013 | Eckl et al. |
| 8,466,889 B2 | 6/2013 | Tong et al. |
| 8,482,381 B2 | 7/2013 | Chatterjee et al. |
| 8,487,759 B2 | 7/2013 | Hill |
| 8,488,308 B2 | 7/2013 | Ng et al. |
| 8,502,547 B2 | 8/2013 | Philipp |
| 8,525,778 B2 | 9/2013 | Colgate et al. |
| 8,536,978 B2 | 9/2013 | Coggill |
| 8,570,162 B2 | 10/2013 | Ujii |
| 8,570,297 B2 | 10/2013 | Bulea |
| 8,581,901 B2 | 11/2013 | Joshi |
| 8,587,542 B2 | 11/2013 | Moore |
| 8,593,409 B1 | 11/2013 | Heubel |
| 8,610,684 B2 | 12/2013 | Kalu et al. |
| 8,633,901 B2 | 1/2014 | Orr et al. |
| 8,633,911 B2 | 1/2014 | Schediwy et al. |
| 8,633,916 B2 | 1/2014 | Bernstein et al. |
| 8,648,816 B2 | 2/2014 | Homma et al. |
| 8,671,782 B2 | 3/2014 | Mink |
| 8,686,839 B2 | 4/2014 | Posamentier |
| 8,686,961 B2 | 4/2014 | Yamano |
| 8,717,152 B2 | 5/2014 | Bhatia et al. |
| 8,730,199 B2 | 5/2014 | Sleeman et al. |
| 8,760,669 B2 | 6/2014 | Heath et al. |
| 8,783,106 B1 | 7/2014 | Nielson et al. |
| 8,799,827 B2 | 8/2014 | Hinckley et al. |
| 8,810,522 B2 | 8/2014 | Tse |
| 8,830,188 B2 | 9/2014 | Verthein et al. |
| 8,836,648 B2 | 9/2014 | Wilairat |
| 8,854,317 B2 | 10/2014 | Homma et al. |
| 8,884,892 B2 | 11/2014 | Bakker |
| 8,898,564 B2 | 11/2014 | Grant |
| 8,901,783 B2 | 12/2014 | Gregory et al. |
| 8,907,661 B2 | 12/2014 | Maier |
| 8,915,422 B1 | 12/2014 | Harty |
| 8,937,603 B2 | 1/2015 | Flanagan et al. |
| 8,976,537 B2 | 3/2015 | Ito |
| 8,982,051 B2 | 3/2015 | Rosenfeld et al. |
| 9,001,060 B2 | 4/2015 | Harris |
| 9,013,405 B2 | 4/2015 | Kujawski et al. |
| 9,013,430 B2 | 4/2015 | McCann |
| 9,030,306 B2 | 5/2015 | Lim et al. |
| 9,030,419 B1 | 5/2015 | Freed |
| 9,054,627 B2 | 6/2015 | Garg et al. |
| 9,086,740 B2 | 7/2015 | Furukawa |
| 9,110,532 B2 | 8/2015 | Ando et al. |
| 9,111,424 B2 | 8/2015 | Lim et al. |
| 9,120,009 B2 | 9/2015 | Bae et al. |
| 9,122,325 B2 | 9/2015 | Peshkin |
| 9,122,345 B2 | 9/2015 | Chen |
| 9,128,523 B2 | 9/2015 | Buuck |
| 9,148,190 B1 | 9/2015 | Buuck et al. |
| 9,158,407 B2 | 10/2015 | Coulson et al. |
| 9,164,605 B1 | 10/2015 | Pirogov |
| 9,182,859 B2 | 11/2015 | Coulson et al. |
| 9,207,801 B2 | 12/2015 | Schediwy et al. |
| 9,222,693 B2 | 12/2015 | Gourlay |
| 9,223,471 B2 | 12/2015 | Buxton |
| 9,262,002 B2 | 2/2016 | Momeyer et al. |
| 9,274,682 B2 | 3/2016 | Hinckley et al. |
| 9,282,893 B2 | 3/2016 | Longinotti-Buitoni et al. |
| 9,298,260 B2 | 3/2016 | Karaoguz |
| 9,304,587 B2 | 4/2016 | Wright et al. |
| 9,348,473 B2 | 5/2016 | Ando |
| 9,349,552 B2 | 5/2016 | Huska |
| 9,360,968 B2 | 6/2016 | Wright |
| 9,372,543 B2 | 6/2016 | Lo et al. |
| 9,389,686 B2 | 7/2016 | Zoller |
| 9,389,688 B2 | 7/2016 | Tossavainen et al. |
| 9,417,695 B2 | 8/2016 | Griffin et al. |
| 9,448,626 B2 | 9/2016 | Cruz-Hernandez et al. |
| 9,449,476 B2 | 9/2016 | Lynn et al. |
| 9,454,256 B2 | 9/2016 | Fisher et al. |
| 9,477,342 B2 | 10/2016 | Daverman et al. |
| 9,772,688 B2 | 9/2017 | Patel et al. |
| 9,798,409 B1 | 10/2017 | Wells et al. |
| 2004/0080494 A1 | 4/2004 | Fahlman |
| 2007/0152966 A1 | 7/2007 | Krah et al. |

(56) References Cited

U.S. PATENT DOCUMENTS

| | | |
|---|---|---|
| 2008/0018611 A1 | 1/2008 | Serban et al. |
| 2008/0068343 A1 | 3/2008 | Hoshino et al. |
| 2008/0084384 A1 | 4/2008 | Gregorio et al. |
| 2008/0111791 A1 | 5/2008 | Nikittin |
| 2008/0165159 A1 | 7/2008 | Soss et al. |
| 2008/0191648 A1 | 8/2008 | Ito et al. |
| 2008/0297478 A1 | 12/2008 | Hotelling et al. |
| 2009/0002199 A1 | 1/2009 | Lainonen et al. |
| 2009/0027038 A1 | 1/2009 | Garmire et al. |
| 2009/0102805 A1 | 4/2009 | Meijer et al. |
| 2009/0115734 A1 | 5/2009 | Fredriksson et al. |
| 2009/0167704 A1 | 7/2009 | Terlizzi et al. |
| 2009/0174672 A1 | 7/2009 | Schmidt |
| 2009/0225046 A1 | 9/2009 | Kim |
| 2009/0242282 A1 | 10/2009 | Kim |
| 2009/0316380 A1 | 12/2009 | Armstrong |
| 2009/0322183 A1 | 12/2009 | Kawakubo |
| 2010/0107067 A1 | 4/2010 | Vaisanen |
| 2010/0141408 A1 | 6/2010 | Doy et al. |
| 2010/0149111 A1 | 6/2010 | Olien |
| 2010/0149124 A1 | 6/2010 | Kim |
| 2010/0164959 A1 | 7/2010 | Brown et al. |
| 2010/0182263 A1 | 7/2010 | Aunio et al. |
| 2010/0214239 A1 | 8/2010 | Wu |
| 2010/0225600 A1 | 9/2010 | Dai et al. |
| 2010/0245254 A1 | 9/2010 | Olien et al. |
| 2010/0328229 A1 | 12/2010 | Weber et al. |
| 2011/0163985 A1 | 7/2011 | Bae et al. |
| 2011/0227872 A1 | 9/2011 | Huska et al. |
| 2012/0013531 A1 | 1/2012 | Wilson |
| 2012/0038568 A1 | 2/2012 | Colloms et al. |
| 2012/0038577 A1 | 2/2012 | Brown et al. |
| 2012/0050230 A1 | 3/2012 | Harris |
| 2012/0062491 A1 | 3/2012 | Coni et al. |
| 2012/0105367 A1 | 5/2012 | Son et al. |
| 2012/0133496 A1 | 5/2012 | Aono |
| 2012/0139860 A1 | 6/2012 | Hotelling et al. |
| 2012/0154315 A1 | 6/2012 | Aono |
| 2012/0182238 A1 | 7/2012 | Lee |
| 2012/0229264 A1 | 9/2012 | Bosch et al. |
| 2012/0235942 A1 | 9/2012 | Shahoian et al. |
| 2012/0319987 A1 | 12/2012 | Woo |
| 2012/0320085 A1 | 12/2012 | Mei et al. |
| 2012/0326981 A1 | 12/2012 | Ku Rose |
| 2013/0057558 A1 | 3/2013 | Pu et al. |
| 2013/0076652 A1 | 3/2013 | Leung |
| 2013/0154933 A1 | 6/2013 | Sheik-Nainar |
| 2013/0179827 A1 | 7/2013 | Eriksson et al. |
| 2013/0198625 A1 | 8/2013 | Anderson et al. |
| 2013/0222267 A1 | 8/2013 | Almalki |
| 2013/0222289 A1 | 8/2013 | Kwak |
| 2013/0321290 A1 | 12/2013 | Oh |
| 2014/0028575 A1* | 1/2014 | Parivar ................ G06F 3/0414 |
| | | 345/173 |
| 2014/0176485 A1 | 6/2014 | Holmberg et al. |
| 2014/0191973 A1 | 7/2014 | Zellers et al. |
| 2014/0197936 A1 | 7/2014 | Biggs et al. |
| 2014/0198071 A1 | 7/2014 | Algreatly |
| 2014/0341420 A1 | 11/2014 | Karkkainen et al. |
| 2014/0347289 A1 | 11/2014 | Suh et al. |
| 2015/0089435 A1 | 3/2015 | Kuzmin |
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2015/0155474 A1 | 6/2015 | Tanimoto et al. |
| 2015/0177899 A1 | 6/2015 | Degner et al. |
| 2015/0192482 A1 | 7/2015 | Araki et al. |
| 2015/0227280 A1 | 8/2015 | Westerman et al. |
| 2015/0234493 A1 | 8/2015 | Parivar et al. |
| 2015/0242037 A1 | 8/2015 | Pedder et al. |
| 2015/0301642 A1 | 10/2015 | Hanaur et al. |
| 2015/0346881 A1 | 12/2015 | Watazu |
| 2016/0085355 A1* | 3/2016 | Pirogov ................. G06F 3/041 |
| | | 345/174 |
| 2016/0091972 A1 | 3/2016 | Patel et al. |
| 2016/0162031 A1 | 6/2016 | Westerman et al. |
| 2016/0188010 A1 | 6/2016 | Wright et al. |
| 2017/0268942 A1 | 9/2017 | Pedder et al. |
| 2018/0120940 A1 | 5/2018 | Kessler et al. |

FOREIGN PATENT DOCUMENTS

| | | |
|---|---|---|
| CN | 101482785 | 7/2009 |
| CN | 101523329 | 9/2009 |
| CN | 101763193 A | 6/2010 |
| CN | 101833393 | 9/2010 |
| CN | 101868770 | 10/2010 |
| CN | 102047088 | 5/2011 |
| CN | 102084325 | 6/2011 |
| CN | 102084328 | 6/2011 |
| CN | 102144205 | 8/2011 |
| CN | 102339166 | 2/2012 |
| CN | 102426490 | 4/2012 |
| CN | 102640093 | 8/2012 |
| CN | 1496549 | 10/2012 |
| CN | 102713805 | 10/2012 |
| CN | 102870080 | 1/2013 |
| CN | 103097990 | 5/2013 |
| DE | 102010007486 | 8/2011 |
| EP | 2077490 | 7/2009 |
| EP | 2202619 | 6/2010 |
| EP | 2320309 | 5/2011 |
| EP | 2357547 | 8/2011 |
| EP | 2375306 | 10/2011 |
| EP | 2381340 | 10/2011 |
| EP | 2395414 | 12/2011 |
| EP | 2648071 | 10/2013 |
| JP | 2007034991 | 2/2007 |
| KR | 101274123 | 6/2013 |
| KR | 20130109288 | 10/2013 |
| TW | 201314541 | 4/2013 |
| WO | WO 12/161061 | 11/2012 |
| WO | WO 13/169299 | 11/2013 |
| WO | WO 13/169303 | 11/2013 |
| WO | WO 13/169305 | 11/2013 |
| WO | WO 13/188307 | 12/2013 |
| WO | WO 14/017407 | 1/2014 |
| WO | WO 14/018111 | 1/2014 |
| WO | WO 15/020663 | 2/2015 |

OTHER PUBLICATIONS

Pava et al., "Real Time Platform Middleware for Transparent Prototyping of Haptic Applications," 2004.
Technifast, "Blind Captive Nuts," Jun. 30, 2013, http://www.technifast.co.uk.
Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.
Product Specification Sheet: GEEPLUS, VIBRO1 Vibration Actuator, 2 pages, www,geeplus.biz, downloaded on Jul. 15, 2015.

* cited by examiner

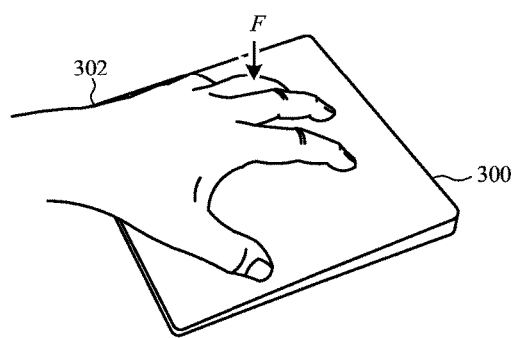
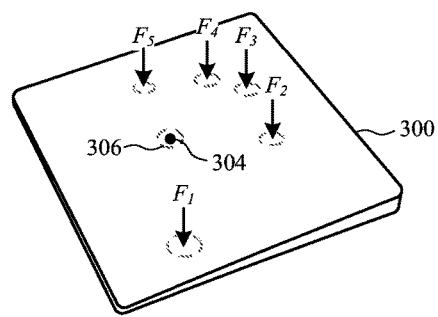
*FIG. 3A*  *FIG. 3B*

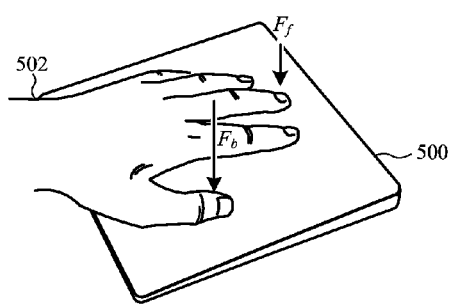 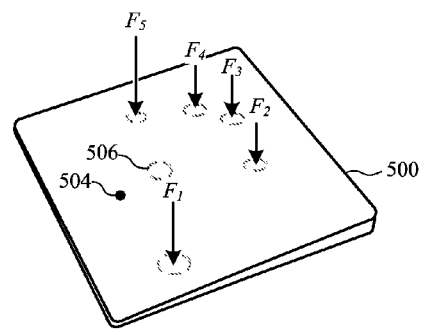
FIG. 5A  FIG. 5B
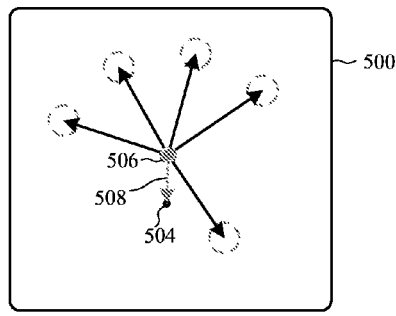 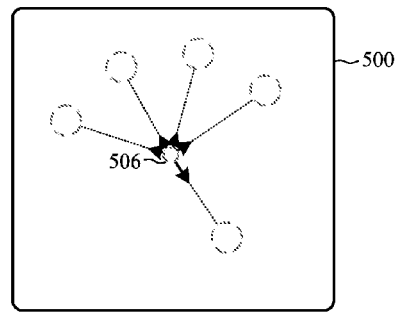
FIG. 5C  FIG. 5D
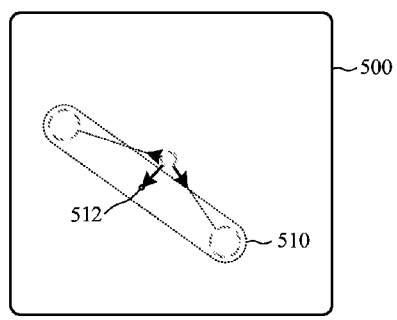
FIG. 5E

DETECTING MULTIPLE SIMULTANEOUS FORCE INPUTS TO AN INPUT DEVICE

CROSS-REFERENCE TO RELATED APPLICATION

This application is a continuation of U.S. patent application Ser. No. 14/637,563, filed Mar. 4, 2015, and entitled "Multi-Force Input Device", which is incorporated by reference in its entirety as if fully disclosed herein.

TECHNICAL FIELD

Embodiments described herein generally relate to input devices and, more particularly, to detecting an amount of force applied at a location on a surface of an input device.

BACKGROUND

A user can interact with an interface provided by an electronic device, such as a personal computer through a touch-sensitive input device such as a trackpad or touch screen. For example, a personal computer can receive a command from a trackpad when an object comes into contact with the trackpad and in response, the personal computer can perform a task, such as modifying a user interface element.

In some examples, a touch-sensitive input device can include a force sensor to provide force information to an electronic device that further characterizes a touch input event. For example, some input devices can estimate an amount of force applied during a touch event, and can relay that information to an electronic device. The electronic device may then interpret the force information from the force sensor as a command, performing different tasks in response to different magnitudes of applied force.

In many cases, however, force information provided by a force sensor that is associated with a conventional touch-sensitive input device may become unreliably imprecise or inaccurate if the input device receives more than one force at the same time. For example, if a user rests his or her wrist at one location while applying a force with a finger at another location, the touch-sensitive input device may not accurately register the force applied by the user's finger. In these and other examples, a user may become confused or frustrated when an electronic device does not respond to aforce input in the manner the user expects.

Accordingly, there may be a present need for an improved force-sensitive input device capable to detect and relay a proportional force applied at more than one contact location.

SUMMARY

Embodiments described herein may relate to, include, or take the form of an input device including a contact sensor (e.g., multi-touch sensor) to detect a first and second object engaging a surface of the input device at a first and second location, respectively. The input device can also include a force sensor array to determine a magnitude and a centroid of a force applied to the surface. In many cases the force sensor array can include a number of individual force-sensitive elements distributed about and coupled to the surface. For example, in embodiments in which the input device includes a rectangular or square surface, four individual force-sensitive elements can be coupled to the four corners of the surface.

The input device can also include a processor to resolve a force vector into a first vector component and a second vector component originating at the first and second location, respectively. In many embodiments, the magnitude of the first vector component and the second vector component can be directly proportional to (or may be associated with) a magnitude of force applied at the first and second locations, respectively.

Some embodiments described herein may relate to, include, or take the form of a method of operating an input device with a plurality of force sensors coupled to a surface thereof. The method may include the operations of determining the locations of a first and a second object engaging the surface, determining a contact centroid from the locations, determining contact vectors originating from the contact centroid and terminating at the first and the second locations respectively, determining a combined force magnitude from individual force magnitudes received from the force sensors, determining a force centroid from the locations of each force sensor in the plurality of force sensors, determining a force vector with the force centroid and the combined magnitude, determining a first and second force projection vector by projecting the force vector onto each of the first and second contact vectors respectively, scaling the first and second force projection vector by the magnitude of the first and second contact vectors, respectively, and by the combined force magnitude, and associating a first and a second contact force to the first and the second locations having magnitudes proportionally based on the magnitudes of the first and second force projection vector, respectively.

In these examples, the contact force may be a force proportional to, representative of, or associated with an amount of force applied at the respective locations on the surface of the input device. For example, if the input device detects a user engaging the surface of the input device with five fingers, the contact force of each of the five fingers can be calculated.

In some cases, certain contact locations can be grouped together and a group contact force can be calculated based on the centroid of that group. Thereafter, the group contact force can be distributed among the members of the group to improve the estimation of the contact forces of the individual group members. In some cases, the contact force of a contact location that is a member of a group can be adjusted, replaced, supplemented, or otherwise modified based on that group's determined contact force.

For example, some embodiments described herein may relate to, include, or take the form of a method of operating an input device (having a plurality of force sensors coupled to a surface of the input device) including at least the operations of determining a contact centroid from a number of contact locations of a number of objects engaging a surface of the input device, determining a number of contact vectors (each associated with a respective one of the contact locations), determining a force centroid and a force vector from the force sensors, determining a contact force for each contact location, determining a number of subgroups and/or subgroupings of the contact locations, determining for each subgroup an average contact force, and adjusting the contact force for each location within the subgroup based on the magnitude of the average contact force.

BRIEF DESCRIPTION OF THE FIGURES

Reference will now be made to representative embodiments illustrated in the accompanying figures. It should be understood that the following descriptions are not intended

FIG. 3A depicts a perspective view of an example input device receiving five localized force inputs that are substantially equal in magnitude, one from each of a user's five fingers, at five contact locations on a top surface of the input device.

FIG. 3B depicts a perspective view of the input device of FIG. 3A, showing an approximate location of a force centroid resulting from the user's input.

FIG. 5A depicts a perspective view of the input device of FIG. 3A receiving five localized force inputs that are not substantially equal in magnitude at five contact locations on a top surface of the input device.

FIG. 5B depicts a perspective view of the input device of FIG. 4A, showing an approximate location of a force centroid resulting from the user's input.

FIG. 5C depicts a top plan view of the input device of FIG. 4A modeling five contact vectors and one force vector.

FIG. 5D depicts a top plan view of the input device of FIG. 4C modeling a projection of the force vector onto each contact vector.

FIG. 5E depicts a top plan view of the input device of FIG. 4C modeling a projection of the force vector onto an average contact vector formed from a group of two contact points.

The use of the same or similar reference numerals in different figures indicates similar, related, or identical items.

DETAILED DESCRIPTION

Figure 1:
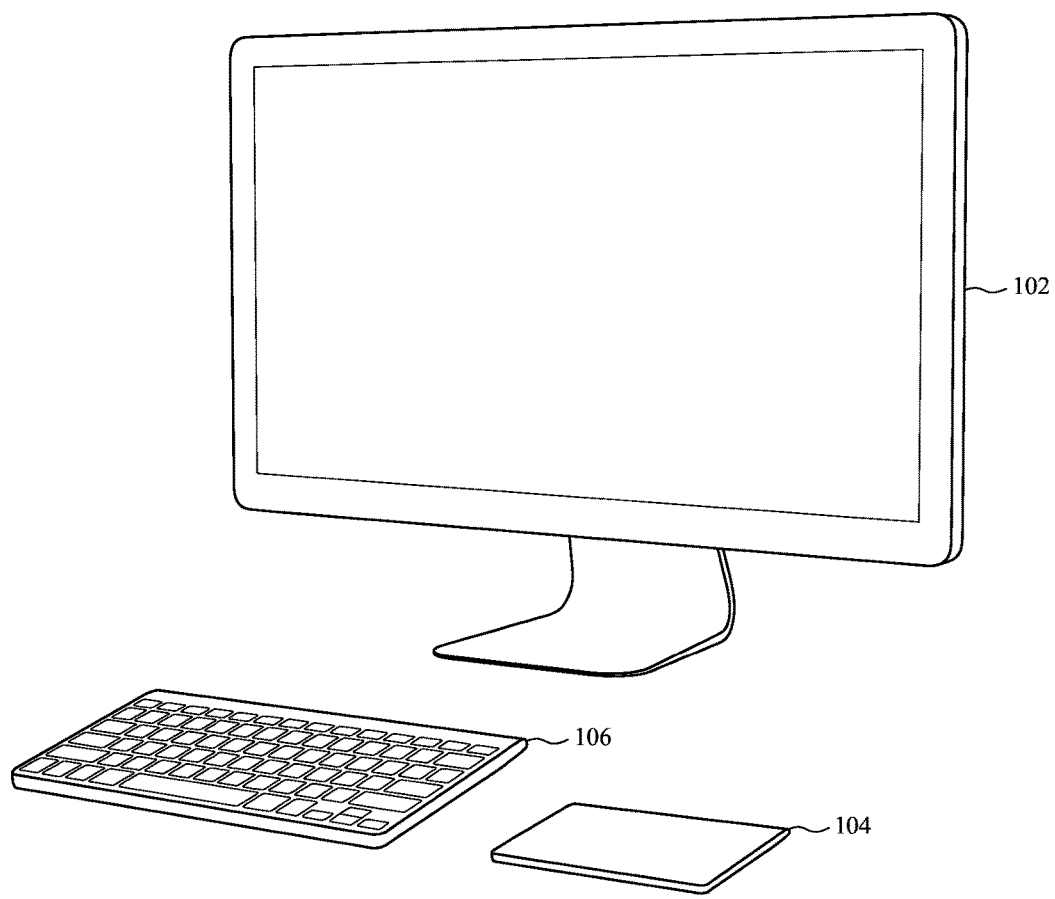
FIG. 1 depicts an example electronic device connected to one or more input devices.

Embodiments described herein may relate to, include, or take the form of an input device to detect the relative magnitude of force applied at distinct locations across a surface of the input device.

Although many embodiments are described herein with reference to peripheral input devices for use with computing devices, it should be appreciated that some embodiments can take other forms and may be included within different form factors. For example, an input device can be included as a component of an electronic device. Accordingly, it should be appreciated that the various embodiments described herein, as well as the functionality, operation, components, and capabilities thereof, may be combined with other elements as necessary, and so any physical, functional, or operational discussion of an element or feature is not intended to be limited solely to a particular embodiment to the exclusion of others.

Embodiments described herein relate to force and touch-sensitive input devices for use with electronic devices and, more specifically, to input devices capable to receive multiple simultaneous force inputs. The multiple simultaneous force inputs can be received by an electronic device and can be used, for one example, as input to the electronic device.

In many embodiments, an input device can include a contact sensor (such as a touch sensor or touch sensor array) to detect the location of one or more objects that engage an input surface of the input device. In certain embodiments, the contact sensor can monitor an electrical property of the input surface, such as conductance or capacitance. Upon detecting that the electrical property has changed at a location or area of the input surface, the contact sensor can report to the input device that an object is contacting the input surface at the location or area. In many cases, contact sensors may report the location(s) of all objects engaging the input surface. For example, a contact sensor may report five independent contact locations when a user positions five fingers on the input surface.

In many embodiments, an input device also includes a number of force-sensitive elements each coupled to an input surface of the input device. In many embodiments, the force-sensitive elements can be coupled directly to the input surface, although this is not necessarily required.

In some embodiments, a force-sensitive element may be formed from a material or formed into a structure, such that upon application of a force (e.g., compression, expansion, tension, strain), one or more electrical properties of the material or structure can measurably change. Force-sensitive electrical properties can include conductance, accumulated charge, inductance, magnetic field strength, electrical field strength, capacitance, and so on.

In one example, a force-sensitive element can be formed from a piezoelectric material that may measurably accumulate charge in response to an applied force. The accumulation of charge can be linearly correlated to force applied to the force-sensitive element, or in other cases, the accumulation of charge can be correlated to force with a different relationship.

In another example, a force-sensitive element can be formed as a structure (such as a number of layered materials) having a capacitance that measurably varies with force. The variation in capacitance can be linear, exponential, or can have some other known relationship.

In another example, a force-sensitive element can be formed from a strain-sensitive material that may measurably change in conductance (e.g., resistance) in response to a force. As with some embodiments described herein, a known relationship (e.g., linear, exponential, and so on) between conductance and force can be used to determine a relative amount of force applied to the strain-sensitive material.

In these embodiments, the input device can monitor the one or more electrical properties of each force-sensitive element. Upon detecting that the electrical property or properties have changed, the input device can determine a magnitude of force applied to each element. In addition, the input device can determine a sum of magnitudes measured from all force-sensitive elements ("total force").

Many embodiments described herein combine information received from the contact sensor with information received from the force-sensitive elements in order to determine a relative or approximate amount of force provided at each contact location. For example, in one embodiment, the geometric centroid of all contact locations ("contact centroid") can be compared to the geometric centroid of force applied ("force centroid"). The contact centroid can be determined from the arithmetic mean location of all points of contact to the input device. The force centroid can be calculated by weighting the geometric centroid of the all force-sensitive elements by the individual force magnitudes detected by those elements. By comparing the contact centroid to the force centroid, a directional force bias can be determined.

For example, if the contact centroid is equal to the force centroid, the input device can determine that each contact point may be applying approximately equal force to the input surface, dividing the total force evenly among the contact locations. In this example, the input device can report to an electronic device that no directional force bias exists and that all contact points are applying substantially equal force to the input device.

Alternatively, if the force centroid is offset from the contact centroid, the input device can determine that a directional force bias exists. The input device can define the directional force bias as a vector originating at the contact centroid, oriented in the direction of the force centroid, and having a magnitude based on the distance between the two and/or on the total force. In some examples, the input device can report a directional force to an electronic device as a user input.

In one example, an input device can be coupled to a personal gaming system displaying a car racing game. In this examples, a directional force bias can be interpreted as an instruction to direct a car depicted in the game to turn to the left or to the right. In another example, the magnitude of force can be correlated to the speed of the car.

For one example, an input device can be coupled to a personal computer displaying a three-dimensional representation of an object. In this example, a directional force bias can be interpreted as an instruction to rotate the three-dimensional object along a particular axis and at a particular speed. For example, a user may position five fingers of the user's right hand on the input device. By leaning the hand to the left, the force applied to the input device at the thumb and index finger may be greater than the force applied by the user's little finger. In response to the left-biased application of force, the personal computer can rotate the three-dimensional object to the left (e.g., along the Z-Axis) at a speed proportional to the magnitude of the bias. Similarly, by leaning the hand to the right to provide a right-biased force, the personal computer can rotate the three-dimensional object to the right along the same axis. In the same manner, by leaning the hand forward, the force applied to the input device by the user's four fingers may be greater than the force applied by the user's thumb. In response to the front-biased force, the personal computer can rotate the three-dimensional object into the display (e.g., along the X-Axis). Continuing in this manner, the three-dimensional object can be rotated in any fashion in response to any direction of force bias. Alternatively, if no force-biased exists (e.g., all five fingers apply functionally the same force), the three-dimensional object can remain still.

In some embodiments, an input device can provide approximated force information for each individual contact location detected by the contact sensor. In these embodiments, the force centroid and total force can be used to define a force vector. The force vector can be projected onto contact vectors associated with each individual contact location and the contact centroid. In this manner, the force vector can be resolved into several components, each component associated with a single contact location. In these examples, the input device can report the magnitudes of each component as a magnitude of an approximate force applied at the respective contact location ("contact force") associated therewith. In some examples, the magnitudes of each component can be scaled by the total force.

As may be appreciated, the total force may be equal to the sum of all determined contact forces. In the case that the contact centroid equals the force centroid, all contact forces are equal. In the case of a left-bias total force, the sum of contact forces to the left of the contact centroid may be greater than the sum of contact forces to the right of the contact centroid.

However, in other cases, the total force may be greater than the sum of all determined contact forces. For example, because contact forces are estimations of force applied at a particular contact location, the total sum of the estimations may be less than the total force. In these cases a "residual force" can be calculated as the difference between the total force and the sum of all determined contact forces. In many cases, the residual force can be proportionally or equally distributed among the contact forces before the contact forces are reported to an electronic device. Additionally, in many examples, the total force applied to the input surface may be small, with contact force measurements smaller still.

Further embodiments described herein include an input device configured to assign two or more contact locations to measurement subgroups in order to improve contact force measurements. For example, an input device can group adjacent contact locations together, determine an average contact centroid and an average contact vector between the adjacent contact locations, project the force vector onto the average contact vector, and use the magnitude of the average contact vector to improve the determination of the contact forces of each member of the group.

For one example, an input device can be coupled to a personal computer displaying a three-dimensional representation of an object. As with the example above, force input from a user's five fingers resting on the input device can be interpreted as an instruction to rotate the three-dimensional object along a particular axis and at a particular speed. As noted above, by leaning the hand forward, the force applied to the input device by the user's four fingers may be greater than the force applied by the user's thumb. In response to the contact forces of the four fingers being greater than the contact force of the users thumb, the personal computer can rotate the three-dimensional object into the display (e.g., along the X-Axis).

However, when leaning the hand backward, the force applied to the input device may be centered between the user's thumb and the user's little finger. In many cases, this may result in a force centroid that is positioned very nearby the contact centroid. As a result, the approximated force bias and/or approximated contact forces of the five fingers may be minimal in comparison to the total force. In other words, for backward-biased applications of force, or more generally, for applications of force that are broadly spaced across a surface of the input device (e.g., widely-splayed fingers), approximations of contact forces may be difficult to obtain by merely comparing the total force, contact centroid, and force centroid.

Accordingly, as noted above, certain embodiments can assign individual contact locations to groups of two or more contact locations and can calculate an average contact centroid therefrom. Continuing the example above, the input device may group the thumb and little finger and can determine and/or calculate the average centroid between them. In this embodiment, the contact centroid, force centroid, and average centroid can be compared and a contact vector can be determined from a projection of the force vector onto a vector defined between the force centroid and the average centroid. This magnitude of this projection can then be divided between the thumb and little finger (e.g., evenly, proportionally, and so on) to improve the contact force estimations thereof.

FIG. 1 depicts an example electronic device connected to one or more input devices. The electronic device 102 can be a personal computing device such as a desktop computer that receives user input via one or more input devices such as a touch input device 104 and a keyboard 106.

In many cases, the electronic device 102 can include a processor, memory, power supply and/or battery, network connections, sensors, display screens, input/output ports, acoustic elements, haptic elements, digital and/or analog circuits for performing and/or coordinating tasks of the electronic device 102, and so on. For simplicity of illustration, the electronic device 102 is depicted in FIG. 1 without many of these elements, each of which may be included, partially and/or entirely, within a housing of the electronic device 102. Furthermore, although illustrated as a desktop computer, the electronic device 102 can be another electronic device either stationary or portable. For example, in certain embodiments, the electronic device 102 can be a server, a terminal computing system, a laptop computer, a tablet computer, a cellular phone, a wearable device, a health monitoring device, a home or building automation device, a home or building appliance, a craft or vehicle entertainment, control, and/or information system, a navigation device, and so on.

The touch input device 104 can include a processor, a memory, a power supply and/or battery, network communications, sensors, display screens, acoustic elements, input/output ports, haptic elements, digital and/or analog circuitry for performing and/or coordinating tasks of the touch input device 104, and so on. In some examples, the touch input device 104 can communicate with the electronic device 102 via one or more proprietary or standardized wired and/or wireless interfaces. For example, in certain embodiments, a wired interface can be an interface such as Universal Serial Bus ("USB"), Firewire, Ethernet, and so on. A wireless interface can be Bluetooth, Wi-Fi, Infrared, ultrasonic, and so on. In certain embodiments, the touch input device 104 can communicate with the electronic device via more than one interface at a time.

For simplicity of illustration, the touch input device 104 is depicted in FIG. 1 without many of these elements, each of which may be included, partially and/or entirely, within a housing of the touch input device 104. Furthermore, although illustrated as a peripheral device, separate from the electronic device 102, in some embodiments, the touch input device 104 can be included within the electronic device 102 as a component of the electronic device 102. For example, in certain embodiments, the touch input device 104 can be included within the electronic device 102 as a touch screen. In other embodiments, the touch input device 104 can be included within or integrated within a keyboard, track pad, or other input device.

In many embodiments, the touch input device 104 can also include one or more contact sensors to determine the position of one or more contact locations on a top surface of the touch input device 104. For example, a contact sensor (such as a touch sensor or touch sensor array) can detect the location of one or more objects that engage an input surface of the touch input device 104, such as a stylus or a user's finger. In certain embodiments, a contact sensor can monitor an electrical property of the input surface, such as conductance or capacitance. Upon detecting that the electrical property has changed at a location or area of the input surface, the contact sensor can report to the touch input device 104 that an object is contacting the input surface at the specified location or area. In many cases, contact sensors may report the location(s) of all objects engaging the input surface. For example, a contact sensor may report five independent contact locations when a user positions five fingers on the input surface.

In some embodiments, the touch input device 104 can also include one or more force-sensitive elements (not shown) to detect a magnitude of force applied to the top surface of the touch input device 104. In some examples, the force-sensitive elements can be mechanically coupled to the underside of the input surface. In other examples, the force-sensitive elements can be coupled to the underside of the housing of the touch input device 104.

As noted above, a force-sensitive element associated with the touch input device 104 may be formed from a material or formed into a structure, such that upon application of a force (e.g., compression, expansion, tension, strain), one or more electrical properties of the material or structure can measurably change. Force-sensitive electrical properties can include conductance, accumulated charge, inductance, magnetic field strength, electrical field strength, capacitance, and so on. For example, a force-sensitive element formed from a piezoelectric material can accumulate charge in response to an applied force. In another example, a force-sensitive element can be formed as a structure (such as a number of layered materials) having a capacitance that measurably varies with force. In another example, a force-sensitive element can be formed from a strain-sensitive material that may measurably change in conductance (e.g., resistance) in response to a force. In these and other embodiments, a known relationship (e.g., linear, exponential, and so on) between the electrical property or properties and force applied can be used to determine an amount of force applied to touch input device 104.

Figure 2A:
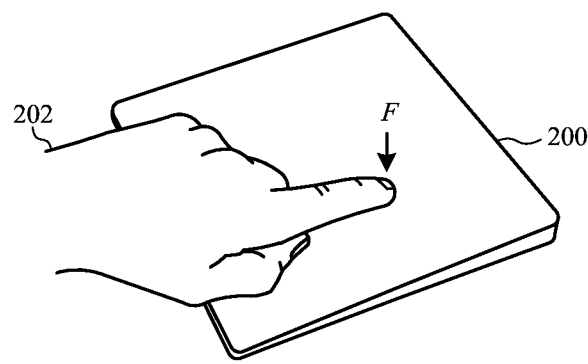
FIG. 2A depicts a perspective view of an example input device receiving a localized force input from a user at a contact location on a top surface of the input device.

FIG. 2A depicts a perspective view of an example input device receiving a localized force input from a user at a contact location on a top surface of the input device. The input device is depicted as touch input device 200. As with the touch input device 104 depicted in FIG. 1, the touch input device 200 depicted in FIG. 2A can be a touch sensitive input device including one or more contact sensors and one or more force-sensitive elements.

The touch input device 200 can include a processor, a memory, a power supply and/or battery, network communications, sensors, display screens, acoustic elements, input/output ports, haptic elements, digital and/or analog circuitry for performing and/or coordinating tasks of the touch input device 200, and so on. In some examples, the touch input device 200 can communicate with an electronic device such as electronic device 102 depicted in FIG. 1 via one or more proprietary or standardized wired and/or wireless interfaces.

The touch input device 200 can be touched by a user 202 on a top surface of the touch input device 200. For example, as illustrated, the user 202 can touch the touch input device 200 with a single finger, depicted in FIG. 2A as the index finger of the user 202. In some examples, the user 202 can apply a downward force F to the touch input device 200 with the index finger. Because the user 202 applies force to the touch input device 200 with the index finger, the force F is applied at the same location the user 202 makes contact with the touch input device 200. Accordingly the force F can be referred to as a contact force. As may be appreciated, the harder the user 202 presses the top surface of the touch input device 200, the greater the magnitude of the contact force will be.

Figure 2B:
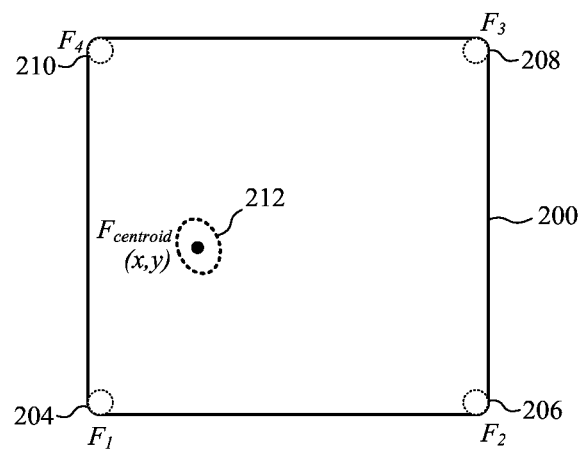
FIG. 2B depicts a bottom plan view of the example input device of FIG. 2A showing four independent force-sensitive elements.

FIG. 2B depicts a bottom plan view of the example input device of FIG. 2A showing four independent force-sensitive elements 204, 206, 208, 210 in phantom. In some embodiments, the force-sensitive elements 204, 206, 208, 210 can be coupled to an interior portion of the housing of the touch input device 200. For example, as illustrated the touch input device 200 takes a rectangular shape and the force-sensitive elements 204, 206, 208, 210 are positioned at corners of the touch input device.

Although illustrated with four force sensitive elements, the touch input device 200 can include a different number in some embodiments. In still further embodiments, the touch input device can position one or more force sensitive elements in other locations (e.g., not limited to placement within the corners of a rectangular input device).

As described above, the force-sensitive elements 204, 206, 208, 210 can be used to determine a force centroid of forces applied to the touch input device 200. For example, the magnitude of force received at each force-sensitive element 204, 206, 208, 210 may differ depending upon the location of the contact force F. In one example, if the contact force F is applied directly above the force-sensitive element 204, the amount of force received by the force-sensitive element 204 may be greater than the forces received by the force-sensitive elements 206, 208, and 210. Similarly, if the contact force F is applied in the geometric center of the touch input device 200, the forces received by each force-sensitive element 204, 206, 208, 210 may be substantially the same.

In other words, the touch input device 200 can use the magnitude force received by each force-sensitive element 204, 206, 208, 210 (force magnitudes F1-F4 respectively) to determine a location of a force centroid 212.

For example, in certain embodiments, the touch input device 200 can use a Cartesian coordinate space such that the location of each force-sensitive element 204, 206, 208, 210 can be identified as $(X_{204}, Y_{204})$, $(X_{206}, Y_{206})$, $(X_{208}, Y_{208})$, $(X_{210}, Y_{210})$ respectively. Accordingly, the location of the force centroid 212 can be modeled as:

$$X_{centroid} = \frac{F_1(X_{204}) + F_2(X_{206}) + F_3(X_{208}) + F_4(X_{210})}{F_1 + F_2 + F_3 + F_4} \quad \text{Equation 1}$$

$$Y_{centroid} = \frac{F_1(Y_{204}) + F_2(Y_{206}) + F_3(Y_{208}) + F_4(Y_{210})}{F_1 + F_2 + F_3 + F_4} \quad \text{Equation 2}$$

In some embodiments, the touch input device 200 can use the contact sensor to determine or assist with the determination of the location of the force centroid. For example, in the illustrated example of a single contact location, the force centroid can be determined to be exactly equal to the center of the point of contact, such as below the index finger of the user 202.

In other examples the calculated force centroid 212 can be used to adjust the contact centroid. For example, certain contact sensors may determine an area of contact (e.g., pad of the index finger as an oval area) instead of a defined contact location. In these examples, the calculated force centroid can be used as a precise contact location.

In other cases, a user can apply a force to an input device with more than one finger. For example, FIG. 3A depicts a perspective view of an example input device receiving five localized force inputs, one from each of the five fingers of the user 302, at five contact locations on a top surface of the touch input device 300. As illustrated, the five fingers of the hand of the user 302 are applying substantially equal force, distributed through five different locations F1-F5 respectively, as shown in FIG. 3B. Thus, the touch input device 300 can determine a force centroid 304 using any suitable method, such as with Equations 1 and Equation 2.

As noted above, the touch input device 300 can also include one or more contact sensors to determine the locations of one or more points of contact on the touch input device 300. In the illustrated figure, the contact sensor of the touch input device 300 can determine that there are five separate contact locations, one associated with one finger of the hand of the user 302. Thereafter, the touch input device 300 can use the contact location(s) obtained by the contact sensor to calculate a contact centroid 306.

In the embodiment illustrated in FIG. 3B, the contact centroid 306 and the force centroid 304 are positioned in substantially the same location, which can indicate to the touch input device 300 that the amount of force applied at each contact location is substantially and/or effectively equal. Accordingly, the touch input device 300 can determine the total force by summing the force magnitudes of the several force sensitive elements and, thereafter, divide the total force by five (corresponding to the five contact locations shown in FIG. 3B), thereby assigning each contact location one fifth of the total force. For example, if the total force is determined to be 1 Newton, the touch input device 300 can report F1=0.2 N, F2=0.2 N, F3=0.2 N, F4=0.2 N, and F5=0.2 N.

In other cases, the total force (and therefore each contact force F1-F5) may be a unitless relative measurement. For example, a force-sensitive element of certain embodiments can output a digital value within a pre-defined range. For example, a 16-bit force-sensitive element can output force on a scale from 0 to 65,535.

Figure 4A:
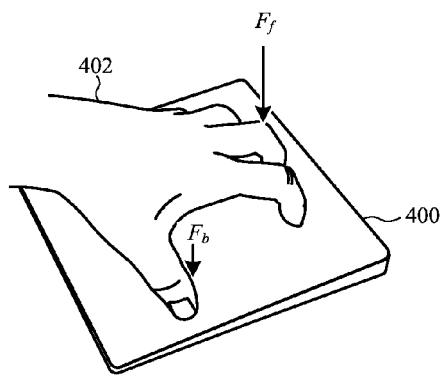
FIG. 4A depicts a perspective view of the input device of FIG. 3A receiving five localized force inputs that are not substantially equal in magnitude at five contact locations on a top surface of the input device.
Figure 4B:
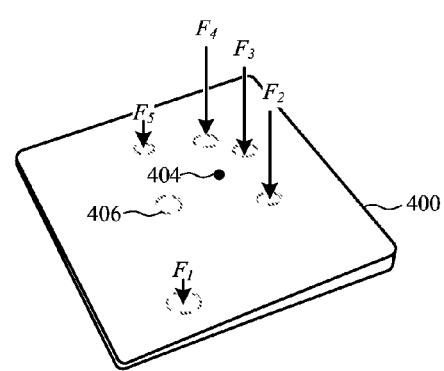
FIG. 4B depicts a perspective view of the input device of FIG. 4A, showing an approximate location of a force centroid resulting from the user's input.

In other cases, the location of a force centroid and a contact centroid may not necessarily be in the same location. For example, as described herein, a user can tilt or lean the users hand to bias the force applied by the user in a particular direction. For example, FIGS. 4A-4B depict a perspective view of a touch input device 400 experiencing a front-biased force resulting from the user 402 pushing the user's hand forward. In the illustrated embodiment, the amount of force applied at the front of the user's hand, $F_f$ may be greater than the force applied at the back of a user's hand $F_b$. In other words, the force applied by the index, middle, and third fingers, F2-F4 respectively, may be greater than the force applied by the thumb and little finger, F1 and F5 respectively. As such, the force centroid 404 can be pushed forward as well, positioned offset from the contact centroid 406 which is unchanged.

Figure 4C:
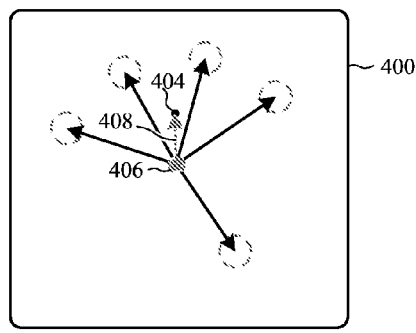
FIG. 4C depicts a top plan view of the input device of FIG. 4A modeling five contact vectors and one force vector.

As illustrated in FIG. 4C, the touch input device 400 can incorporate information related to the contact centroid 406 with the determined force centroid 404 to construct a force vector 408. The force vector 408 can, in one embodiment, originate at the contact centroid 406 and terminate at the force centroid 404. The magnitude (not shown) of the force vector 408 can be based on the total force determined, as noted above, from the sum of all force magnitudes of every force-sensitive element of the touch input device 400. As illustrated, the direction of the force vector 408 can correspond to a force bias. For example, in the illustrated embodiment, the force bias can be a forward force bias.

Figure 4D:
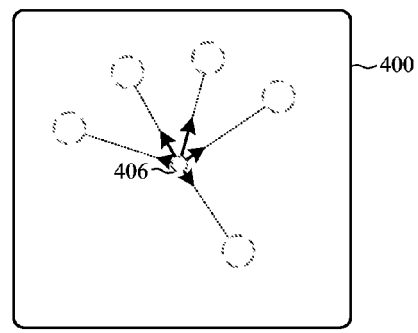
FIG. 4D depicts a top plan view of the input device of FIG. 4C modeling a projection of the force vector onto each contact vector.

As illustrated in FIG. 4D, the touch input device 400 can project the force vector 408 onto each of five contact vectors. Each contact vector can be defined to originate at the contact centroid 406, terminating at the center of each of the five illustrated contact locations. As shown, each of the five contact locations may be a contact area, instead of a single contact point. For example, as illustrated, each of the contact locations is circular or elliptical. In other embodiments, contact locations can take other areas, or can be single contact points. As used herein, phrases such as "center of a contact area" may be understood to refer to the geometric center of a single contiguous contact area. The projections illustrated in FIG. 4D can each be a scalar projection. In many cases, the projections can be scaled by the magnitude of the total force.

Next, the touch input device 400 can create a series of groups from the several touch locations. For example, in the case of the illustrated embodiment, five different contact locations can be grouped in a number of ways. For example, in many embodiments, adjacent contact locations can be grouped together. In some cases, adjacent groups can include two or more individual contact locations. In some embodiments, groups can be formed based on the location of the contact locations. For example, the touch input device 400 can be subdivided into quadrants; any contact location within a particular quadrant can be assigned to a specific group. In still further embodiments, other methods can be used to determine the members of a particular group.

Figure 4E:
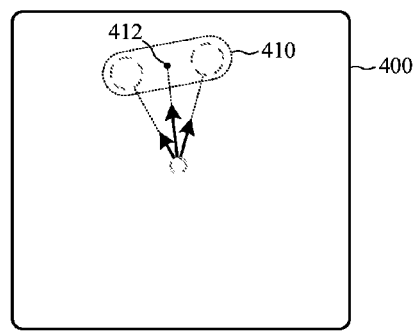
FIG. 4E depicts a top plan view of the input device of FIG. 4C modeling a projection of the force vector onto an average contact vector formed from a group of two contact points.

FIG. 4E illustrates an embodiment in which the touch input device 400 groups two adjacent contact locations (middle and third) into a single group 410. A group centroid 412 can be calculated as the geometric centroid of the two grouped contact locations. Thereafter, and as illustrated, a projection of the force vector onto a group vector, defined from the contact centroid to the group centroid, can be determined. Thereafter, the magnitude of the projection onto the group vector can be used to augment the magnitude of the scalar projections previously calculated (e.g., FIG. 4D) for the contact locations associated with the group.

It may be appreciated that the group depicted in FIG. 4E is merely one example of a possible grouping the touch input device 400 can perform. For example, the touch input device 400 can group the third and little finger, the index and middle finger, the thumb and index finger, and so on. In other examples, more than two individual contact locations can be grouped. For example, three fingers can be grouped, than three independent subgroups can be formed from the three grouped fingers. In other examples, any other number of groupings can be formed. For example, in certain embodiments, more than five contact points can be detected.

In another example, FIGS. 5A-5B depict a perspective view of a touch input device 500 experiencing a back-biased force resulting from the user 502 pulling the user's hand backward. In the illustrated embodiment, the amount of force applied at the front of the user's hand, $F_f$ may be less than the force applied at the back of a user's hand $F_b$. In other words, the force applied by the index, middle, and third fingers, F2-F4 respectively, may be less than the force applied by the thumb and little fingers, F1 and F5 respectively. As such, the force centroid 504 can be pulled backward as well, positioned offset from the contact centroid 506 which, again, is unchanged.

As illustrated in FIG. 5C, the touch input device 500 can incorporate information related to the contact centroid 506 with the determined force centroid 504 to construct a force vector 508. The force vector 508 can, in one embodiment, originate at the contact centroid 506 and terminate at the force centroid 504. The magnitude (not shown) of the force vector 508 can be based on the total force determined, as noted above, from the sum of all force magnitudes of every force-sensitive element of the touch input device 500. As illustrated, the direction of the force vector 508 can correspond to a force bias. For example, in the illustrated embodiment, the force bias can be a backward force bias.

As illustrated in FIG. 5D, the touch input device 500 can project the force vector 508 onto each of five contact vectors. Each contact vector can be defined to originate at the contact centroid 506, terminating at the center of each of the five illustrated contact locations. The projections illustrated in FIG. 5D can each be a scalar projection. In many cases, the projections can be scaled by the magnitude of the total force.

Next, the touch input device 500 can create a series of groups from the several touch locations. For example, as with the embodiment depicted in FIG. 4D, the five different contact locations of FIG. 5D can be grouped in a number of ways. For example, in many embodiments, adjacent contact locations can be grouped together. In some cases, adjacent groups can include two or more individual contact locations. In some embodiments, groups can be formed based on the location of the contact locations. For example, the touch input device 500 can be subdivided into quadrants; any contact location within a particular quadrant can be assigned to a specific group. In still further embodiments, other methods can be used to determine the members of a particular group.

FIG. 5E illustrates an embodiment in which the touch input device 500 groups two adjacent contact locations (thumb and little finger) into a single group 510. A group centroid 512 can be calculated as the geometric centroid of the two grouped contact locations. Thereafter, and as illustrated, a projection of the force vector onto a group vector, defined from the contact centroid to the group centroid, can be determined. Thereafter, the magnitude of the projection onto the group vector can be used to adjust the magnitude of the scalar projections previously calculated (e.g., FIG. 5D) for the contact locations associated with the group.

Figure 6:
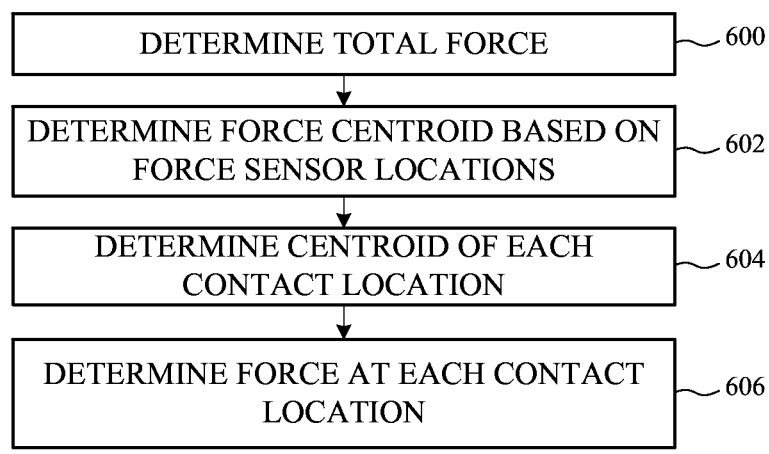
FIG. 6 depicts as a flow chart example operations of a method of determining localized force applied to a surface of an input device.

FIG. 6 depicts as a flow chart example operations of a method of determining localized force applied to a surface of an input device. The method can begin at operation 600 in which a total force is determined from the sum of all outputs from a plurality of force-sensitive elements. At operation 602, a force centroid can be calculated using a method such as those described herein. In many examples, the force centroid is based on the locations of the individual force-sensitive elements. At operation 604, a centroid of each contact location can be determined. Once both the individual contact centroids and the contact location centroid is determined, a force magnitude can be associated with each individual contact location at operation 606.

Figure 7:
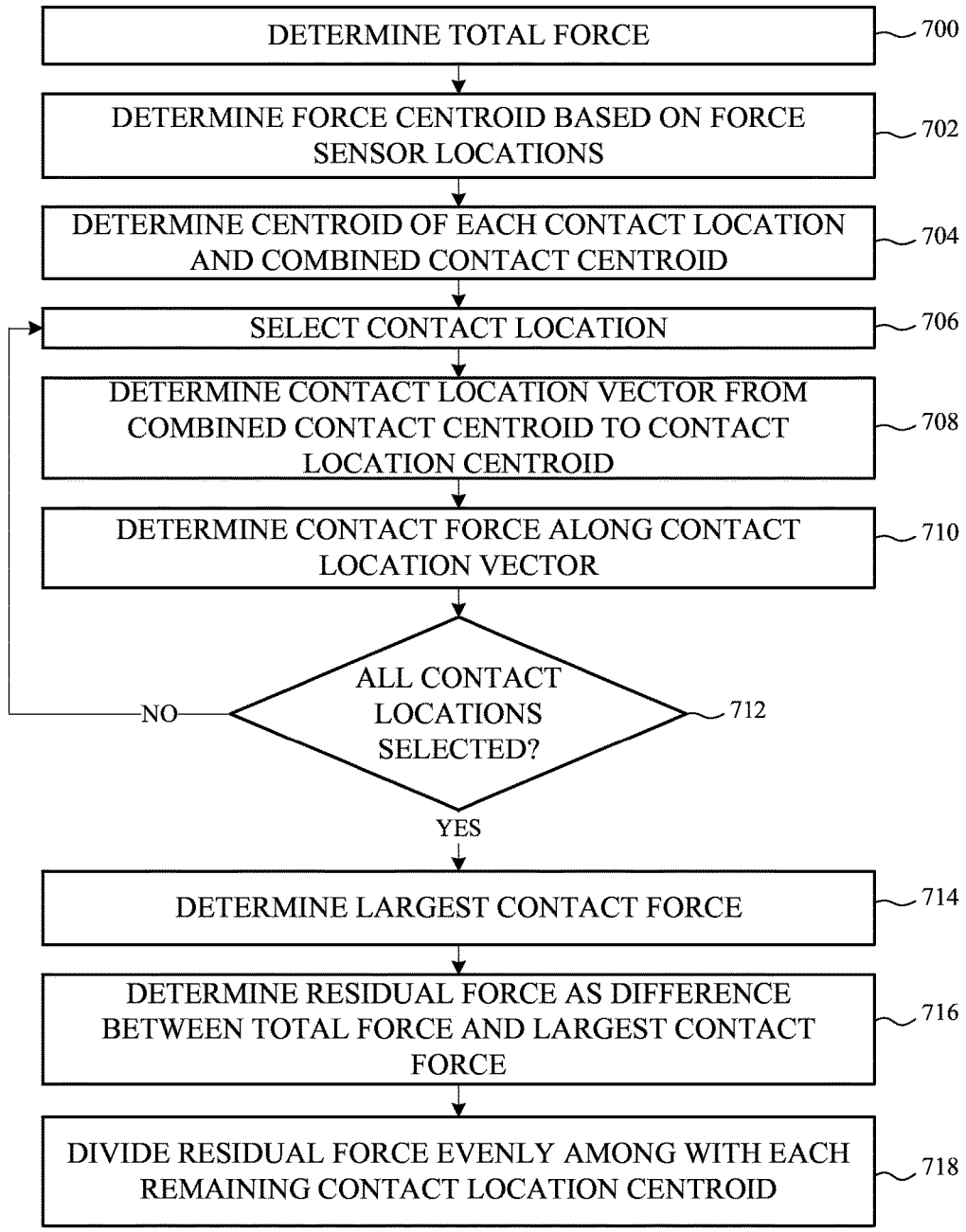
FIG. 7 depicts as a flow chart example operations of a method of determining relative localized force applied to a surface of an input device.

FIG. 7 depicts as a flow chart example operations of a method of determining relative localized force applied to a surface of an input device. The method can begin at operation 700 in which a total force can be calculated from a plurality of force-sensitive elements. At operation 702, a force centroid can be calculated based on the relative positions of each of the plurality of force sensors. At operation 704, a centroid of each contact location can be determined. In addition, a single combined contact centroid can be determined based on the contact location of every contact. Next, at operation 706 a contact location can be selected. Once selected, a contact vector can be determined from the combined contact centroid to the centroid of the selected contact location at operation 708. Next, a contact force can be determined by projecting a force vector onto the contact vector at operation 710. If additional contact locations are yet to be selected, the method can select a new contact location and repeat operations 706 through 710. On the other hand, once all contact locations have been selected, the method can continue at operation 712. At operation 714, the largest contact force can be determined by finding the largest magnitude of the projections determined at operation 710. Once the largest contact force is determined, the residual force can be determined at operation 716 by subtracting the largest contact force from the total force. Next, at operation 718, the residual force can be divided among, and assigned to, every contact location that was not selected at operation 714.

Figure 8:
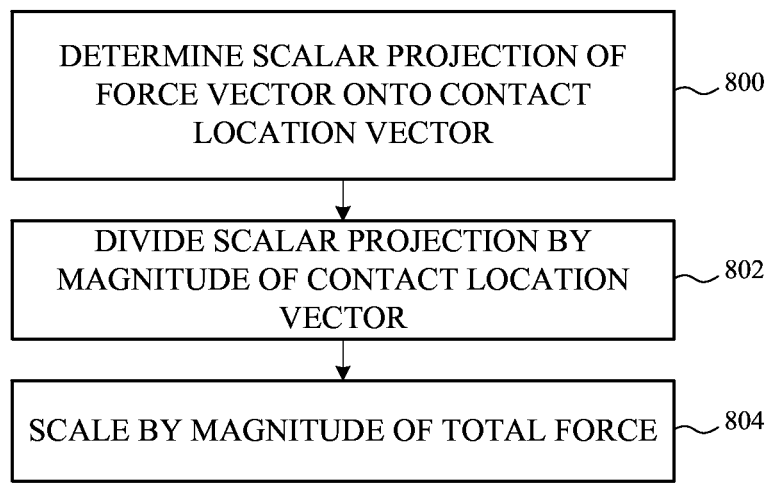
FIG. 8 depicts as a flow chart example operations of another method of determining relative localized force applied to a surface of an input device.

FIG. 8 depicts as a flow chart example operations of another method of determining relative localized force applied to a surface of an input device. The method can begin at operation 800 at which a scalar projection of a force vector onto a contact location vector is determined. Next, at operation 802, the scalar projection can be divided by the magnitude of the contact location vector in order to normalize the vector. Next, at operation 804, the normalized vector can be scaled by the magnitude of a total force calculated, as noted with respect to some embodiments described herein, as the sum of all force sensitive elements associated with the input surface.

Figure 9:
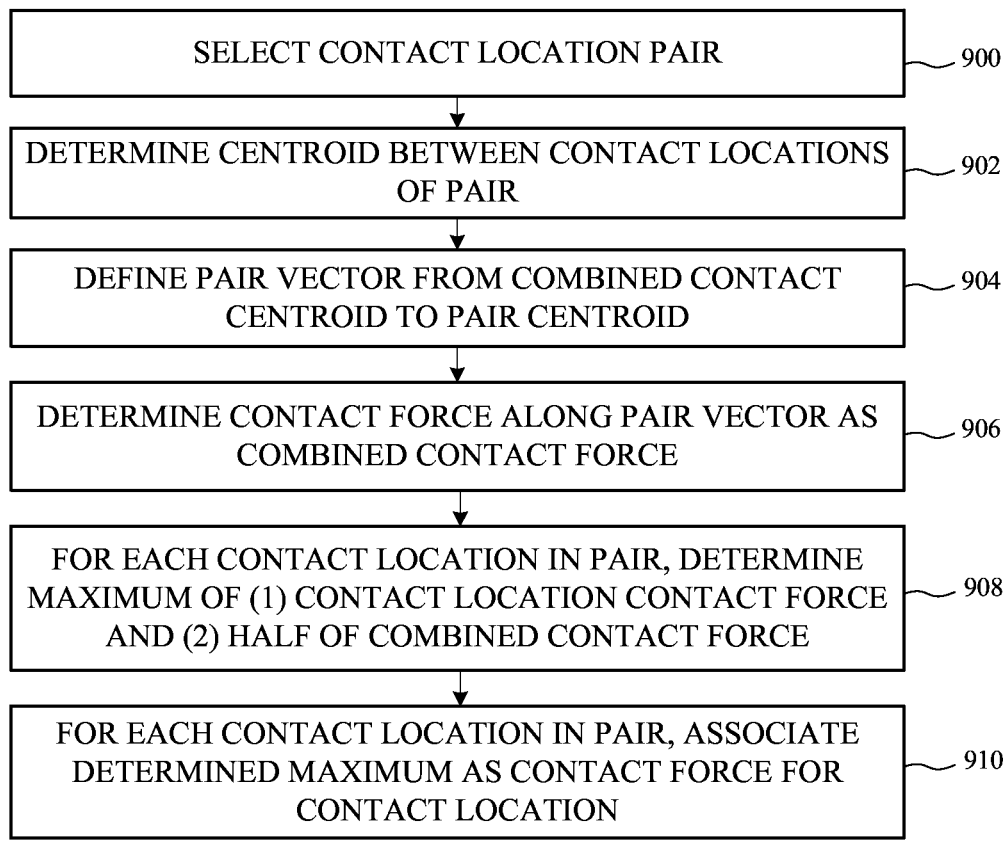
FIG. 9 depicts as a flow chart example operations of another method of determining relative localized force applied to a surface of an input device.

FIG. 9 depicts as a flow chart example operations of another method of determining relative localized force applied to a surface of an input device. The method can begin at operation 900 at which a contact location pair is selected. At operation 902, the centroid between the contact locations of the contact location pair can be selected. At operation 904, a pair vector can be determined and defined from the combined contact location and the calculated pair centroid. Next at operation 906, a vector defining the force applied to the input device can be projected onto the pair vector. Next, at operation 908, for each contact location within the contact location pair, determine the maximum of (1) the individual contact location force and (2) half of the combined contact force. In many examples, the combined contact force can be the magnitude, scaled or otherwise, of the projection of the force vector onto the pair contact vector. Once the maximum is determined at operation 908, the maximum can be associated as the contact force at the respective contact location at operation 910.

Figure 10:
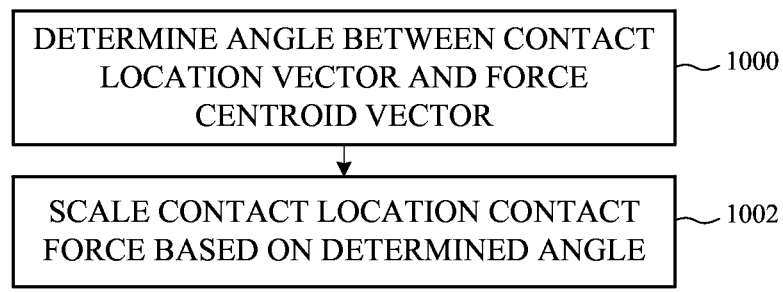
FIG. 10 depicts as a flow chart example operations of another method of determining relative localized force applied to a surface of an input device.

FIG. 10 depicts as a flow chart example operations of another method of determining relative localized force applied to a surface of an input device. The method can begin at operation 1000 at which an angle between a contact location vector and a force centroid vector is calculated. Next, at operation 1002, the determined force at the contact location can be scaled by the determined angle.

One may appreciate that although many embodiments are disclosed above, that the operations presented with respect to methods and techniques described herein are meant as exemplary and accordingly are not exhaustive. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. An input device comprising:
an input surface; and
a processor configured to:
determine, in response to a detected touch input to the input surface, a contact centroid relative to at least three points of contact on the input surface;
determine a grouped contact centroid relative to a subset of the at least three points of contact;
determine, based on a detected force input to the input surface, a grouped force vector relative to the contact centroid and the grouped contact centroid;
assign a force input magnitude to each of the points of contact of the subset based, at least in part, on the grouped force vector; and
providing each force input magnitude and the detected touch input as user input to an electronic device; wherein
the subset comprises at least two points of contact; and
the subset comprises at least one fewer point of contact than the at least three points of contact.

2. The input device of claim 1, further comprising a multi-touch sensor coupled to the input surface, in communication with the processor, and configured to detect the touch input.

3. The input device of claim 1, further comprising a force sensor coupled to the input surface, in communication with the processor, and configured to detect the force input.

4. The input device of claim 3, wherein the force sensor comprises a set of force-sensitive elements coupled to the input surface.

5. The input device of claim 4, wherein at least one force-sensitive element of the set of force-sensitive elements comprises a piezoelectric element.

6. The input device of claim 4, wherein at least one force-sensitive element of the set of force-sensitive elements comprises a capacitive force sensor.

7. The input device of claim 1, wherein the processor is configured to:

determine a contact vector originating at the contact centroid and terminating at the grouped contact centroid; and determine a force projection vector by projecting the grouped force vector onto the contact vector.

8. The input device of claim 7, wherein the processor is configured to:

associate a first and a second contact force with each of the at least two points of contact based on the force projection vector.

9. An input device comprising:

an input surface;

a touch input sensor disposed below the input surface;

a force input sensor disposed below the input surface; and a processor in communication with the touch input sensor and the force input sensor and configured to:

determine, based on output from the touch input sensor, a contact centroid relative to at least three points of contact on the input surface;

determine, based on output from the force input sensor, a force magnitude and a force centroid applied to the input surface;

determine individual contact vectors, each originating at the contact centroid and each associated with a respective one of the at least three points of contact;

determine individual force vectors, each originating at the contact centroid and each associated with a respective one of the at least three points of contact;

determine a grouped contact centroid relative to a subset of the at least three points of contact;

determine a grouped force vector relative to the contact centroid and the grouped contact centroid;

adjusting at least two of the individual force vectors based on the grouped force vector; and providing each individual force vector and the output of the touch input sensor as user input to an electronic device; wherein the subset comprises at least two points of contact; and the subset comprises at least one fewer point of contact than the at least three points of contact.

10. The input device of claim 9, wherein the force input sensor comprises a set of four force sensors.

11. The input device of claim 10, wherein the set of four force sensors are distributed relative to a periphery of the input surface.

12. The input device of claim 10, wherein the input surface is rectangular and the set of four force sensors are positioned at each corner of the input surface.

13. The input device of claim 10, wherein the set of four force sensors are formed from a piezoelectric material.

14. The input device of claim 9, wherein the input surface comprises glass.

15. A method of operating an input device comprising a touch input sensor and a force input sensor disposed below an input surface, the method comprising:

detecting, with the touch input sensor, at least three points of contact on the input surface;

determining a contact centroid of the at least three points of contact;

determining, with the force input sensor, a force magnitude applied to the input surface;

grouping two points of contact and determining a grouped contact centroid and a contact vector originating at the contact centroid;

assigning a first input force to the group based on the force magnitude and the contact vector; and assigning a second input force to points of contact not in the group based on the force magnitude, the first input force, and the contact centroid.

16. The method of claim 15, wherein grouping two points of contact comprises selecting two points of contact adjacent to one another.

17. The method of claim 15, wherein assigning the first input force to the group comprises:

determining a force centroid of the at least three points of contact;

determining a group force vector based on the contact centroid; and projecting the group force vector onto the contact vector.

18. The method of claim 17, further comprising:

determining a force difference between the force magnitude and the first input force and the second input force; and evenly dividing the difference between the group and the points of contact not in the group.

19. A method of determining individual contact forces of multiple force inputs provided to an input device comprising a processor, a touch input sensor and a force input sensor, the method comprising:

determining, by the force input sensor, a total force applied to an input surface of the input device;

determining, by the processor of the input device, a force centroid based on the total force and locations of one or more force sensors of the force input sensor;

determining, by the touch input sensor, individual contact centroids of at least three contact locations and combined contact centroid;

determining individual contact forces, by the processor of the input device, based on the force centroid and the total force, along individual contact vectors defined from the combined centroid to each respective individual contact centroid;

determining, by the processor of the input device, a largest individual contact force from the determined individual contact forces;

determining, by the processor of the input device, a difference between the largest individual contact force and the total force; and dividing, by the processor of the input device, the determined difference evenly among all remaining contact locations that are not associated with the largest individual contact force.

* * * * *